UNITED STATES PATENT OFFICE.

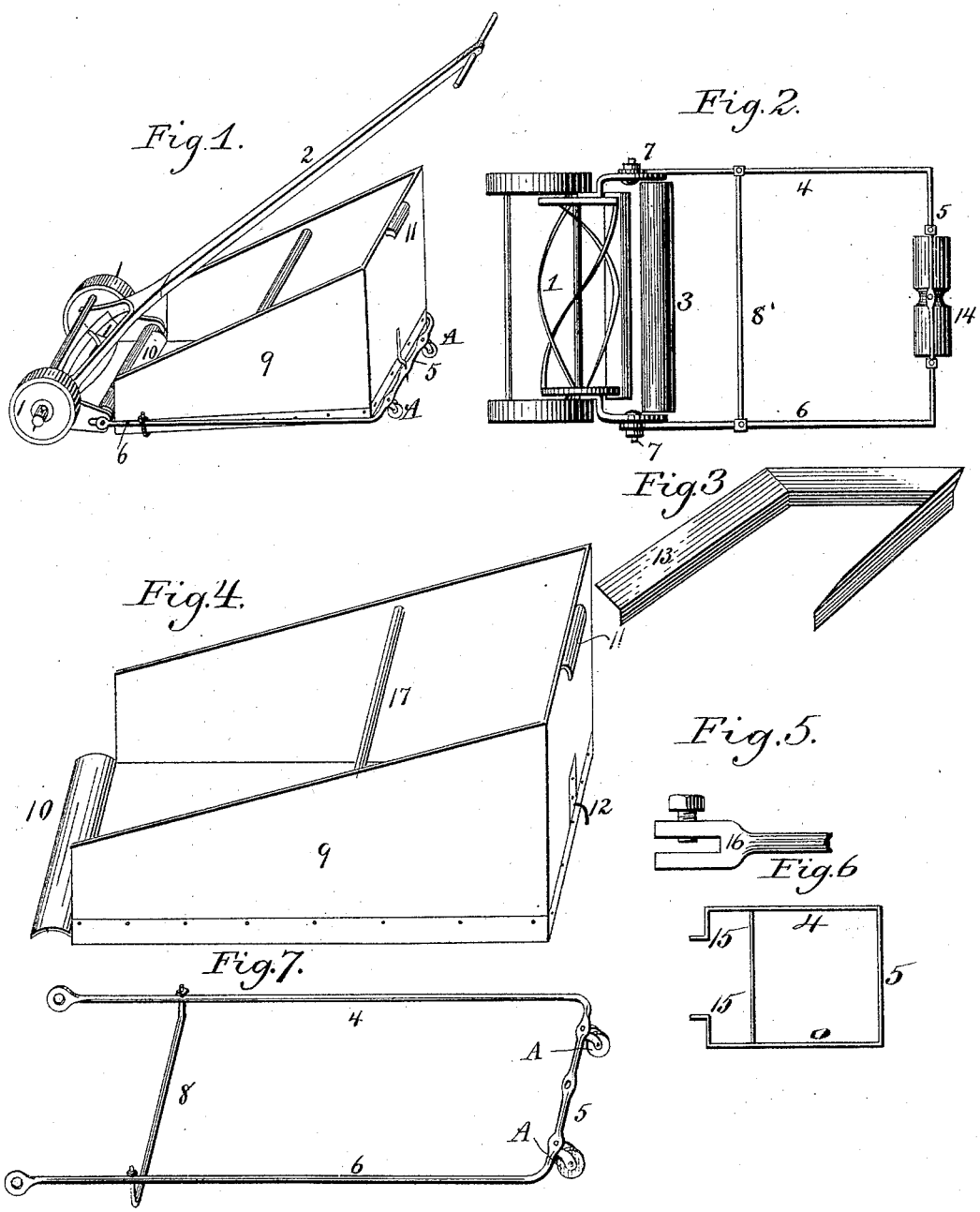

PETER F. KELLEY, OF DENVER, COLORADO.

GRASS-RECEPTACLE FOR LAWN-MOWERS.

SPECIFICATION forming part of Letters Patent No. 421,370, dated February 11, 1890.

Application filed July 30, 1889. Serial No. 319,221. (No model.)

*To all whom it may concern:*

Be it known that I, PETER F. KELLEY, a citizen of the United States, residing at Denver, in the county of Arapahoe and State of Colorado, have invented certain new and useful Improvements in Grass-Receptacles for Lawn-Mowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved device for securement to lawn-mowers; and its objects are to furnish a receptacle for receiving the grass as it is cut, thus preventing the cut grass from being scattered over the lawn and obviating the necessity of raking after cutting, an attachment readily applied, and a receptacle readily placed in or removed from position, simple in construction, efficient, and reliable, to which ends the invention consists in the features and arrangements more particularly hereinafter described and claimed.

In the drawings is illustrated an embodiment of the invention, wherein Figure 1 is a perspective view of the complete attachment in connection with a mower; Fig. 2, a top or plan view thereof; Fig. 3, a view of an additional device which may be used; Fig. 4, a perspective of the box or receptacle detached; Fig. 5, an enlarged view of part of a modified detail; Fig. 6, a plan view, on smaller scale, of a modified framing. Fig. 7 is a perspective view of the frame provided with rollers or casters swiveled thereto.

In the figures the reference-numeral 1 indicates an ordinary lawn-mower having the propelling-handle 2, roller 3, and knives and running and actuating gear of the usual construction. From it and to the rear thereof is supported a frame composed of the sides 4 6 and end 5, formed of any suitable metal—as, for instance, an iron bar bent around to form three sides of a square. This frame is for the support of the receptacle to be hereinafter described, and to aid in such support it should have a cross-brace 8, which may be of much lighter or smaller material than is the frame extending from side to side. It may be secured to the mower by either bolting or clamping. In the main figures the frame is shown as secured in position by the bolts 7, they being the bolts by which the lugs or ears furnishing bearings for the axle or pintle of the roller 3 are secured to the side framings. Upon this frame rests the grass box or receptacle proper 9, preferably having inclined sides, so as to be higher at the rear or closed end than at the front or open end. The bottom thereof projects somewhat at the front beyond the sides, such portion 10 being curved to fit over the roller 3. Secured upon the exterior of the end is a pin 12, projecting below the plane of the bottom, adapted to take in an aperture in the part 5 of the frame, such aperture being shown in Figs. 2 and 7, the box 2 being secured in position by the curved portion 10 taking upon and over the roller 3 and the pin 12 taking in the aperture.

For the ready manipulation of the box or receptacle in removing it from or replacing it upon the frame it is provided with a handle 11 upon its rear end and a handle 17, secured within the sides toward the front thereof. Then as the mower is propelled the cut grass is thrown into the box or receptacle. When sufficiently full, the operator, by means of the handles 11 and 17, readily lifts it from its seat for the deposition of its contents at any desired point, as readily then replacing it.

While the rear of the box or of the frame might be allowed to lie upon and be drawn over the ground, it is preferable, as reducing traction and lessening draft, giving increased ease of operation, to mount the rear of the frame upon a roller 14, here shown as a single roller; but in lieu of one it is evident that more may be used or several sections of roller may be used on a single spindle, or one or more rollers or casters A, swiveled to bar 5 of the frame, may be used, as shown in Figs. 1 and 7, the spindle of the roller or rollers being supported and journaled in suitable bearings projecting from the rear part 5 of the frame.

Where the receptacle is of the width of the mower, there may be a tendency with some mowers to throw grass somewhat to the sides, so that some falls without one or both sides of the receptacle. A removable flange 13, as shown in Fig. 3, may be provided for prevention thereof, made of any light material and adapted to be retained in position by the straight sides depending from the flange 13.

If it be desired to use a receptacle wider than the mower, so as to give for any particular size an increased capacity, the frame may be of the shape shown in Fig. 6, wherein the distance represented by the part 5 is greater than the width of the mower, the sides 4 6 being bent inwardly and then again bent parallel, as shown at 15 15, to bring the ends in proper relation for securement to the mower.

It is evident that in some forms of mowers the frame could be secured thereto by clamping, the ends of the sides being formed into clamps to grasp the lugs or ears supporting the roller 3. A type of clamp by which this may be done is shown at 16 in Fig. 5, which may be supposed to be an enlarged view of the ends of the side parts of the frame. It is also evident that the principle would be the same were the pin 12 secured to and projected upwardly from the part 5 of the frame and an ear or lug be secured to the end of the box or receptacle, the ear or lug having a perforation to pass over and upon the pin. It is also evident that a mere hand-hole might be substituted for the handle 11.

The box or receptacle may be made of any suitable material, as wood or sheet metal, or of wire-cloth or canvas, or other fabric, secured upon a frame adapted to keep it in proper position and give it the proper form.

It is also evident that the roller 14 might be replaced by rollers at each rear corner, and that such rollers might be in the form of ordinary casters.

Having thus described my invention, what I claim is—

1. An attachment for lawn-mowers, consisting of the supporting-frame composed of side bars 4 and 6 and rear end bar 5, bar 5 being provided with an aperture centrally located thereon, one or more rollers or casters suitably swiveled to bar 5 and adapted to support the rear end of the frame, the receptacle 9, provided with pin 12, centrally located on its rear end, projecting downward therefrom and adapted to engage the aperture in bar 5, substantially as described.

2. An attachment for lawn-mowers, consisting of the supporting-frame composed of side bars 4 and 6 and rear end bar 5, bar 5 being provided with an aperture centrally located thereon, roller 14, solid or in sections, supporting the rear end of the frame and suitably connected with bar 5, the receptacle 9, having its bottom curved, as at 10, and projecting beyond its front end, and the pin 12, secured to the central portion of its rear end, projecting downward therefrom and adapted to engage the aperture in bar 5, substantially as described.

In testimony whereof I affix my signature in presence of two witnesses.

PETER F. KELLEY.

Witnesses:
Z. F. WILBER,
WM. KOWALSKI.